Dec. 15, 1964  H. J. BATISTA ETAL  3,161,156
EGG-SHAPED GELATIN MOLDING SYSTEM
Filed July 27, 1961

INVENTORS
HARRY BATISTA
AMERICO GUERRIERO
BY
ATTORNEY

United States Patent Office 3,161,156
Patented Dec. 15, 1964

3,161,156
EGG-SHAPED GELATIN MOLDING SYSTEM
Harry J. Batista and Americo J. Guerriero, both of 1961 Prospect Ave., New York, N.Y.
Filed July 27, 1961, Ser. No. 127,235
6 Claims. (Cl. 107—19)

The present invention relates to a gelatin molding system, and it particularly relates to a gelatin molding system which will prepare the molds in the form of egg-shaped bodies.

It is among the objects of the present invention to provide a gelatin molding system in which the gelatin may be readily molded in the form of an egg or other spherical or ovular shape by housewives or in a restaurant by a chef in preparation of foods and desserts.

Another object of the present invention is to provide a novel gelatin molding system useful for preparing gelatin for edible purposes so that it will have an unique shape and may be used for serving to either children or adults in a most attractive form.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable to form a gelatin mold in the form of an egg which is split midway of its longest dimension by treated telescoping connections extending in a plane transverse to the major axis of the ovular, elliptical or egg shape.

One end of the ovular shaped mold is desirably provided with an inlet opening with which may be associated a pouring funnel.

Desirably, the molding shell is formed of a transparent rigid plastic material such as cellulose acetate, polystyrene, polyethylene or polypropylene and less preferably glass or aluminum.

The gelatin eggs which are formed may be readily removed from the mold by unscrewing two halves of the mold apart. The egg-shaped gelatin molds may be placed in an egg tray and filled and placed in a refrigerator while in such tray.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views.

Figure 1:
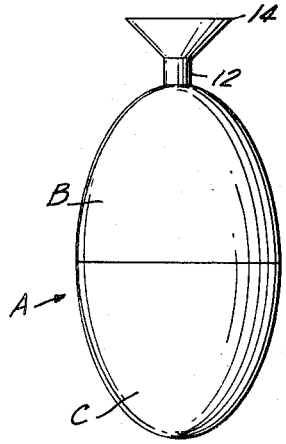
FIG. 1 is a side elevational view of the mold with the funnel in place thereon.
Figure 2:
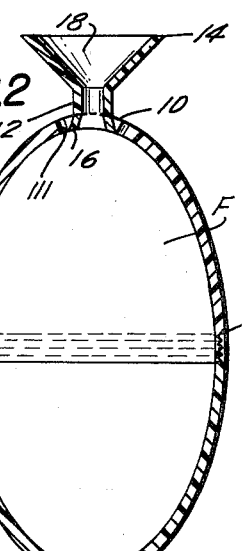
FIG. 2 is a transverse vertical sectional view through the mold of FIG. 1 upon a slightly enlarged scale of FIG. 1.
Figure 3:
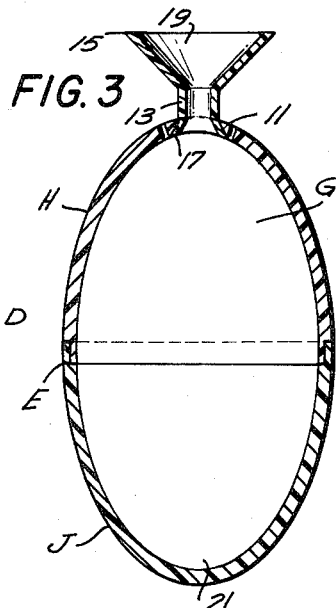
FIG. 3 is a transverse vertical sectional view of an alternative embodiment showing a telescoping connection instead of a screw connection such as shown in FIG. 2.

Referring to FIGS. 1 to 3, there is shown a mold having an upper half B and a lower half C which may be joined together by the screw connection D or the telescoping connection E.

These two shells when joined together will form an egg shaped internal form indicated at F and G in FIGS. 2 and 3.

The upper and lower shells B and C of FIGS. 1 and 2 and H and J of FIG. 3 will have an egg shape so as to form the gelatin in said form.

One end of the egg-shaped device and preferably the upper half shell B or H is provided with an opening 10 or 11 which may receive the neck 12 or 13 of the filling funnel 14 or 15.

The lower end of the necks 12 and 13 will be turned outwardly as indicated at 16 and 17 so as to fill the internal part of the opening 10 and 11.

In forming the egg-shaped gelatin, the liquid is poured into the wide opening 18 or 19 until the egg-shaped members B–C or H–J are filled.

Figure 4:
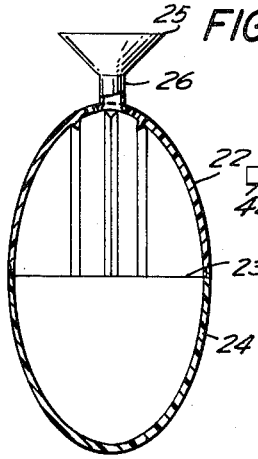
FIG. 4 is a side vertical sectional view similar to FIGS. 2 and 3 but upon a smaller scale showing the vertical inturned ridges for holding one part of the molded material in position and the other part of the shell is removed.

In FIG. 4, there is shown an alternative form in which there are a series of ridges extending vertically around the interior of the upper shell 22 which terminate at the junction line 23 with the lower shell 24.

The funnel 25 with the narrow supporting neck 26 may be of the same construction as described in connection with FIGS. 2 and 3.

In this manner, one-half of the molded gelatin egg will be held in position while the cover 20 is either pulled out from the connection E of FIG. 3 or is unscrewed from the connection D of FIG. 2.

In molding these gelatin eggs, a holding tray K may be employed having the legs 35 with a top plate 36 having a plurality of openings 37 therein of decreasing diameter downwardly.

Figure 5:
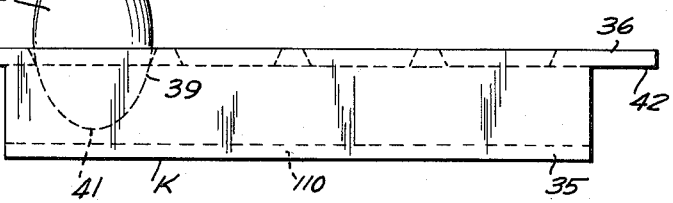
FIG. 5 is a side elevational view of the tray which may be used for carrying the molded gelatin egg mold.
Figure 6:
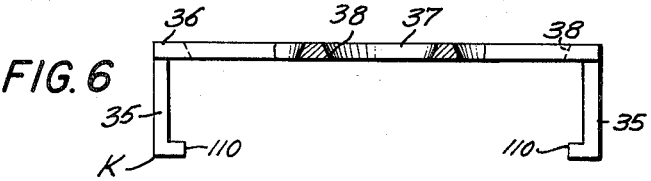
FIG. 6 is an end view of the tray of FIG. 5.

As a result, these openings 37 will form contact bevels 38 which will support the lower sides 39 of the molded egg structure L (see FIG. 5).

The legs 35 desirably extend along each side 40 of the tray, and they will elevate the supporting plate 36 sufficiently above the ends of the legs so that the bottom portions 41 of the eggs will contact the table refrigerator shelf or other support.

The handle members 42 will extend beyond the legs 35 and will enable the tray readily to be lifted and to be moved from place to place for serving purposes.

It is thus apparent that the applicants have provided a simple attractive arrangement for molding gelatin in egg-shaped form which will enable service of the gelatin in new and attractive forms.

Instead of the egg-shaped form shown, spherical or other ovular shapes may be employed.

Where the interior is irregular as for example in connection with a polyhedron shape, the telescoping connection such as E is employed since it is not desirable to turn the interior cast gelatin against irregular shapes.

Desirably, the interior of the molded thin plastic shells B and C of FIGS. 1 and 2 and H and J of FIG. 3 and 22 and 24 of FIG. 4 will be so coated as to permit ready removal of the molded gelatin without any stickiness or attachment as would cause it to adhere to the interior of the walls.

This separation may also be aided by dipping in luke warm water using funnel as a handle.

Figure 7:
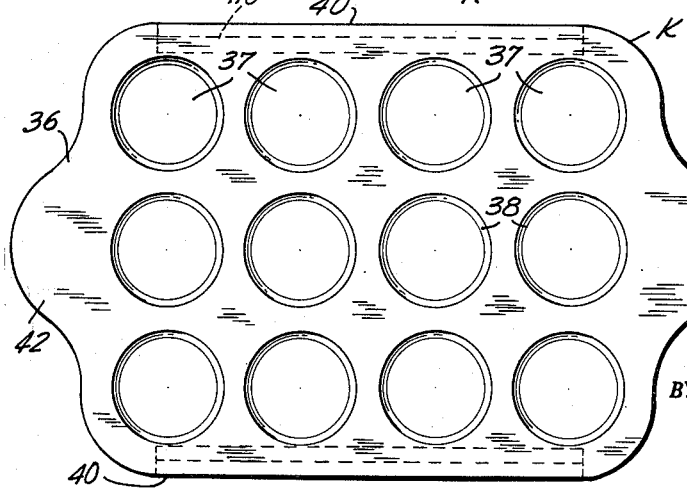
FIG. 7 is a top plane view of the tray of FIG. 5.

Both the molds of FIGS. 1 to 4 as well as the tray of FIGS. 5 and 7 may be made of various molded plastics such as cellulose acetate, polystyrene, polyethylene, polypropylene or methyl methacrylate.

Although egg shapes are shown as preferred, they can also be made up as diamond, geometrical, conical or arcuate shapes.

As many changes could be made in the above egg-shaped gelatin molding system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A gelatin egg molding system comprising a stand having vertical parallel laterally elongated side legs and an elevated platform mounted on said legs having end portions extending beyond said legs and said platform having a plurality of spaced openings arranged in parallel rows with downwardly convergent beveled edges and a plurality of ovular-shaped molds, each ovular shaped mold having split halves joined together on a plane transverse to the major longitudinal axis of the mold and having an inlet opening at one end to permit a liquid gelatin composition to be poured into the mold, each said mold having an upper half with a depending inside telescoping portion and a lower half with an upper outside telescoping portion and said platform being spaced by said legs so that the lower side of the lower half portions are substantially above the lower ends of the legs, and said spaced openings each having an upwardly beveled portion contacting the lower half portion of each mold.

2. A gelatin egg molding system comprising a stand having vertical parallel laterally elongated side legs and an elevated platform mounted on said legs having end portions extending beyond said legs and said platform having a plurality of spaced openings arranged in parallel rows with downwardly convergent beveled edges and a plurality of ovular-shaped molds, each ovular shaped mold having split halves jointed together on a plane transverse to the major longitudinal axis of the mold and having an inlet opening at one end to permit a liquid gelatin composition to be poured into the mold, said inlet opening being provided with a pouring funnel, each said mold having an upper half with a depending inside telescoping portion and a lower half with an upper outside telescoping portion and said platform being spaced by said legs so that the lower side of the lower half portions are substantially above the lower ends of the legs, and said spaced openings each having an upwardly beveled portion contacting the lower half portion of each mold.

3. A gelatin egg molding system comprising a stand having vertical parallel laterally elongated side legs and an elevated platform mounted on said legs having end portions extending beyond said legs and said platform having a plurality of spaced openings arranged in parallel rows with downwardly convergent beveled edges and a plurality of ovular-shaped molds, each ovular shaped mold having split halves joined together on a plane transverse to the major longitudinal axis of the mold and having an inlet opening at one end to permit a liquid gelatin composition to be poured into the mold, said junction between the split halves being provided with a screw threaded arrangement, each said mold having an upper half with a depending inside telescoping portion and a lower half with an upper outside telescoping portion and said platform being spaced by said legs so that the lower side of the lower half portions are substantially above the lower ends of the legs, and said spaced openings each having an upwardly beveled portion contacting the lower half portion of each mold.

4. A gelatin egg molding system comprising a stand having vertical parallel laterally elongated side legs and an elevated platform mounted on said legs having end portions extending beyond said legs and said platform having a plurality of spaced openings arranged in parallel rows with downwardly convergent beveled edges and a plurality of ovular-shaped molds, each ovular shaped mold having split halves joined together on a plane transverse to the major longitudinal axis of the mold and having an inlet opening at one end to permit a liquid gelatin composition to be poured into the mold, said junction of said split halves being provided with a telescoping unthreaded connection, each said mold having an upper half with a depending inside telescoping portion and a lower half with an upper outside telescoping portion and said platform being spaced by said legs so that the lower side of the lower half portions are substantially above the lower ends of the legs, and said spaced openings each having an upwardly beveled portion contacting the lower half portion of each mold.

5. A gelatin egg molding system comprising a stand having vertically parallel laterally elongated side legs and an elevated horizontal platform mounted on said legs, said platform having end portions extending beyond said legs and said legs having inturned lower end portions and said platform having a plurality of spaced openings arranged in parallel rows with downwardly convergent beveled edges and a plurality of egg-shaped molds having upper and lower half portions positioned in and contacting said openings said molds being positioned so that their longitudinal axes are vertically positioned and the upper and lower half portions meeting at the widest central portions of the molds and having telescoping junction portions, each said mold having an upper half with a depending inside telescoping portion and a lower half with an upper outside telescoping portion and said platform being spaced by said legs so that the lower side of the lower half portions are substantially above the lower ends of the legs, and said spaced openings each having an upwardly beveled portion contacting the lower half portion of each mold.

6. A gelatin egg molding system comprising a stand having vertically parallel laterally elongated side legs and an elevated horizontal platform mounted on said legs, said platform having end portions extending beyond said legs and said legs having inturned lower end portions and said platform having a plurality of spaced openings arranged in parallel rows with downwardly convergent beveled edges and a plurality of egg-shaped molds having upper and lower half portions positioned in and contacting said openings said molds being positioned so that their longitudinal axes are vertically positioned and the upper and lower half portions meeting at the widest central portions of the molds and having telescoping junction portions, the height of said side legs being such that the lower ends of the egg-shaped molds will contact the table refrigerator shelf when inserted in a refrigerator and said telescoping junction portions having inside telescoping elements projecting downwardly from the upper half portion and having outside telescoping portions projecting upwardly from the lower half portions.

References Cited in the file of this patent

UNITED STATES PATENTS

| D. 31,256 | Anderson | July 18, 1899 |
| 2,166,568 | Kuhlke | July18, 1939 |
| 2,618,130 | Leichtman et al. | Nov. 18, 1952 |
| 3,091,194 | Dickinson | May 28, 1963 |

FOREIGN PATENTS

| 152,810 | Australia | Aug. 13, 1953 |